12/8/87 OR 4,711,531

United States Patent [19]

Masubuchi

[11] Patent Number: 4,711,531

[45] Date of Patent: Dec. 8, 1987

[54] FERROELECTRIC LIQUID CRYSTAL DISPLAY APPARATUS USING A RESET VOLTAGE STEP

[75] Inventor: Sadao Masubuchi, Tokorozawa, Japan

[73] Assignee: Citizen Watch Co., Ltd., Tokyo, Japan

[21] Appl. No.: 770,938

[22] Filed: Aug. 30, 1985

[30] Foreign Application Priority Data

Sep. 11, 1984 [JP] Japan ................................ 59-189997

[51] Int. Cl.⁴ ................................................ G02F 1/13

[52] U.S. Cl. ................................ 350/350 S; 350/333

[58] Field of Search ............................ 350/333, 350 S

[56] References Cited

U.S. PATENT DOCUMENTS

| | | | |
|---|---|---|---|
| 4,508,429 | 4/1985 | Nagae et al. | 350/350 S |
| 4,591,886 | 5/1986 | Umeda et al. | 350/350 S X |
| 4,608,558 | 8/1986 | Amstutz et al. | 350/350 S X |
| 4,613,209 | 9/1986 | Goodby et al. | 350/350 S |
| 4,634,226 | 1/1987 | Isogai et al. | 350/350 S X |
| 4,655,561 | 4/1987 | Kanbe et al. | 350/333 X |

*Primary Examiner*—Stanley D. Miller
*Assistant Examiner*—Richard F. Gallivan
*Attorney, Agent, or Firm*—Pollock, VandeSande & Priddy

[57] ABSTRACT

In the ferroelectric liquid crystal display apparatus, the molecule alignment or orientation of the ferroelectric liquid crystal is refreshed by the reset voltage before the succeeding signal display commences. The line shift signal of the oscillator in the control unit is sent to the shift register to select the scanning electrode to which the reset voltage is applied every scanning period.

4 Claims, 9 Drawing Figures

FERROELECTRIC LIQUID CRYSTAL DISPLAY APPARATUS USING A RESET VOLTAGE STEP

BACKGROUND OF THE INVENTION

1. Field of the Invention

The present invention relates to a liquid crystal display apparatus employing ferroelectric liquid crystal in the form of a matrix type display panel.

2. Description of Prior Art

Liquid crystal representing a chiral smetic C-phase, or a chiral smetic H-phase is known as ferroelectric liquid crystal in the field. In such ferroelectric liquid crystal, the molecular arrangement is changeable on the order of microseconds in response to externally-applied sufficient supply voltage. Accordingly, the ferroelectric liquid crystal is greatly expected to be used for the matrix type liquid crystal display utilizing a number of the scanning lines.

There is a drawback that when the matrix type liquid crystal display panel employing the ferroelectric liquid crystal display panel is driven by means of the conventional direct driving method with one line at a scanning system, brightness of the displayed pixel of the panel undesirably depends upon that of the previously-displayed pixel, i.e., so-called "hysteresis phenomenon", resulting in deterioration of the display reliability. The above driving method is conventionally utilized in the matrix type display panel employing the twisted nematic (TN) type liquid crystal.

An object of the present invention is to provide a matrix type liquid crystal display apparatus of higher display reliability.

Another object of the present invention is to provide a matrix type liquid crystal display apparatus employing the ferroelectric liquid crystal.

SUMMARY OF THE INVENTION

These objects of the present invention may be accomplished by providing a liquid crystal display apparatus comprising:

a plurality of scanning electrodes;

a plurality of signal electrodes positioned perpendicular to the scanning electrodes to form a matrix and enclosing a ferroelectric liquid crystal layer having a plurality of pixels in conjunction with the scanning electrodes;

a first driver for selecting and sequentially driving the scanning electrodes by applying write-in voltages thereto;

a second driver for driving the signal electrodes by applying thereto voltages corresponding to display contents of the display apparatus in synchronism with the application of the write-in voltages; and, a controller coupled to the first and second drivers, for controlling the first driver so as to apply reset voltages to the respective pixels of the ferroelectric liquid crystal layer, whereby orientation of the liquid crystal's molecule remains fixed before the selection of the scanning electrodes.

BRIEF DESCRIPTION OF DRAWINGS

For a better understanding of these and other objects of the present invention, reference is made to the following detailed description of the invention to be read in conjunction with the following drawings, in which.

DETAILED DESCRIPTION OF PREFERRED EMBODIMENT

Figure 1:
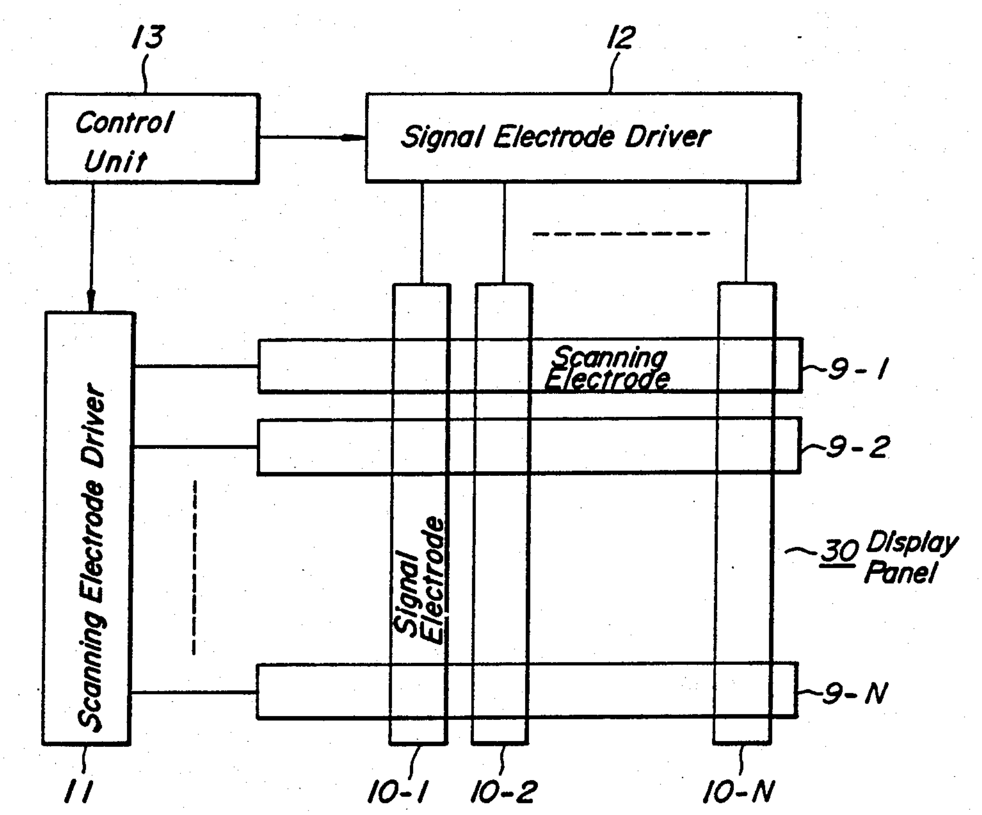
FIG. 1 is a schematic circuit diagram of a liquid crystal display apparatus according to one preferred embodiment of the present invention.

Referring now to FIG. 1, a schematic arrangement of a liquid crystal display apparatus according to the invention will be described.

A plurality of scanning electrodes 9-1 to 9-N (N being a certain number) is connected to a scanning electrode driver 11. Similarly, a plurality of signal electrodes 10-1 to 10-N (N being a certain number) is connected to a signal electrode driver 12. Both the scanning electrodes 9-1 through 9-N and the signal electrodes 10-1 through 10-N constitute a matrix type display panel 30. A control unit 13 is connected to the scanning electrode driver 11 and also the signal electrode driver 12 respectively. A detailed circuit of the control unit 13 will be described hereinafter.

According to the invention, the ferroelectric liquid crystal of the chiral smetic C-phase (4' - ortho -(2 - methyl) - butyle - resorcylide - 4- octyl aniline) is provided between substrates for forming the respective electrodes 9 and 10.

Figure 2:
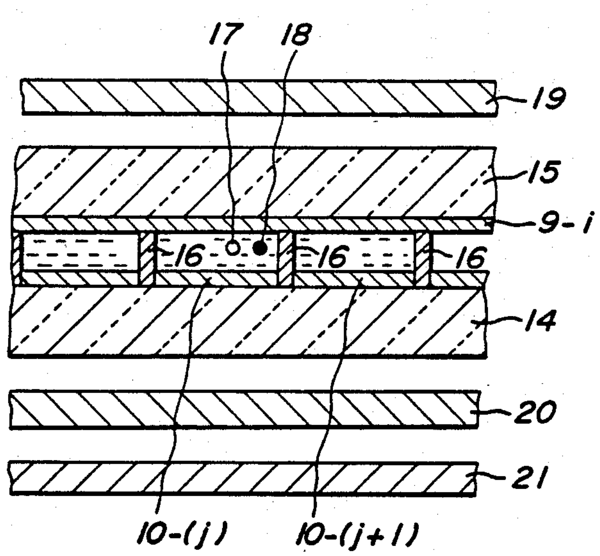
FIG. 2 partially shows a cross-sectional view of the display panel shown in FIG. 1.

For a better understanding, an enlarged drawing of a certain pixel (i, j) of the liquid crystal panel 30 is shown in FIG. 2. A pair of substrates 14 and 15 is made of glass and is opposite to each other. Spacers 16 are positioned between the substrates 14 and 15 via the scanning electrode (9-*i*) and the signal electrodes 10-*j* and 10-(j+1). These electrodes are formed in the following way: after the signal electrodes 10-*j* and 10-(j+1) are formed on the first substrate 14, a polyimide resin having a film thickness of approximately 4 μm (micrometers) is coated over the entire surface of the first substrate 14, and thereafter patterning-treated by the dry etching. Reference numeral 17 denotes the molecule of the chiral smetic C-phase liquid crystal. The longitudinal axis of the liquid crystal molecule is aligned with the vertical direction with respect to the drawing's panel, i.e., parallel to the spacers 16. Reference numeral 18 indicates the dye molecule.

In the liquid crystal display apparatus as shown in FIGS. 1 and 2, the black dye is employed. The orientation of the dye molecule is substantially the same as that of the liquid crystal molecule. An upper polarizing plate 19 is positioned over the first substrate 15. The elongated axis of the upper polarizing plate 19 extends parallel to the drawing's plane. A lower polarizing plate 20 is positioned below the second substrate 14. A reflective diffusion plate or light source having a scattering plate 21 is further positioned under the lower polarizing plate 20.

It should be noted that when the dye molecule is not injected into the liquid crystal, the lower polarizing plate 20 may be omitted. Furthermore, in such a specific case, the elongated axis of the lower polarizing plate 20 is positioned parallel to, or perpendicular to that of the upper polarizing plate 19.

A description will now be made of the display principles of the liquid crystal panel 30.

Figure 3A:
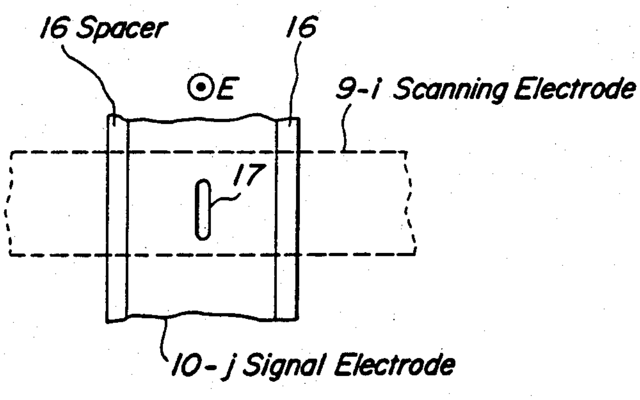
FIGS. 3A and 3B illustrate molecule alignment conditions of a certain pixel.
Figure 3B:
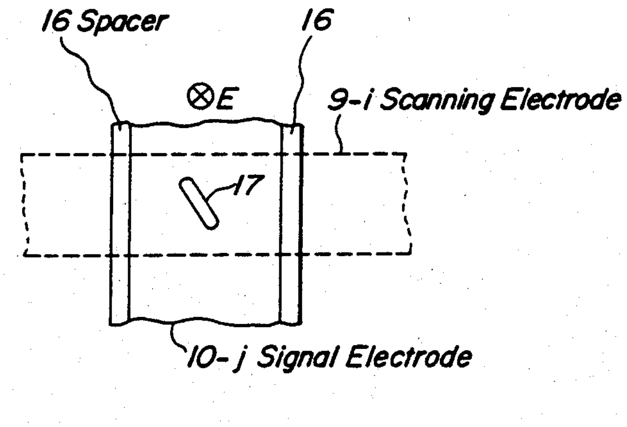

FIGS. 3A and 3B illustrate the relations between the direction of the applied electric field and the alignment of the liquid crystal molecule. In FIG. 3A, the electric field E is applied to the liquid crystal molecule 17 along the lower direction of the drawing. In FIG. 3B, it is, on the other hand, applied to the liquid crystal molecule 17 along the upper direction of the drawing. When the dye molecule is mixed with the liquid crystal molecule, the alignment of the longitudinal axis of the dye molecule is changed depending upon the direction of the applied voltage while it is aligned substantially parallel to the longitudinal axis of the liquid crystal molecule. A change in the alignment depending upon the direction of the applied voltage may cause a contrast change of the display panel due to the polarization effects of the polarizing plates.

FIG. 4 illustrates waveforms of voltages to be applied to the various electrodes of the liquid crystal display panel 30.

Figure 4A:
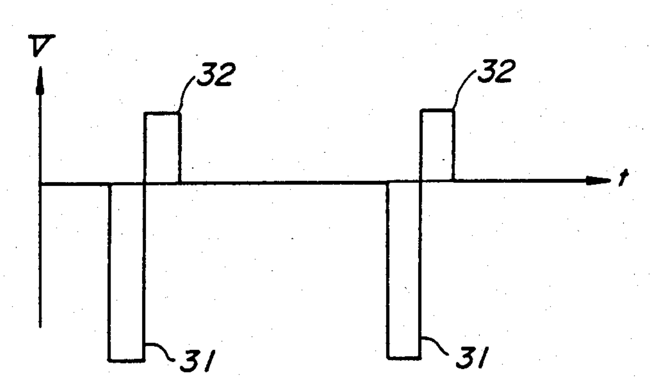
FIGS. 4A to 4C show waveforms of voltages to be applied to the electrodes.
Figure 4B:
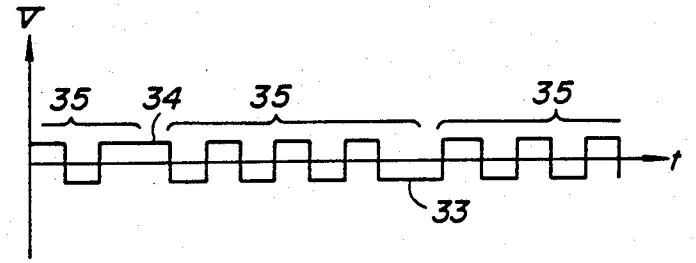
Figure 4C:
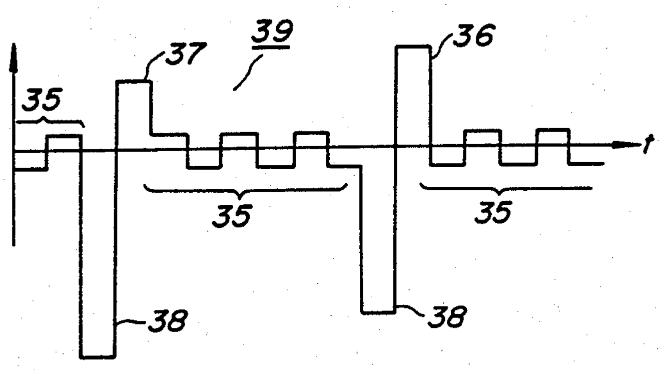

FIG. 4A is a waveform of a voltage to be applied to the scanning electrodes, e.g., the electrode 9-*i*. Reference numeral 31 denotes a reset voltage and reference numeral 32 indicates a write voltage. In FIG. 4B, there is shown a voltage to be applied to the signal electrodes, e.g., the electrode 10-*j*. Between the ON-voltage 33 and the OFF-voltage 34, a signal voltage 35 is applied. The signal voltage 35 reflects contents of the signal information to be displayed on the display panel 30. FIG. 4C shows an actual voltage 39 to be applied to a predetermined pixel (i, j). This actual voltage 39 is obtained by adding the scanning electrode voltage shown in FIG. 4A to the signal electrode voltage shown in FIG. 4B. The actual voltage 39 is constituted by an actual reset voltage 38, an actual ON-voltage 36, an actual OFF-voltage 37 and an actual signal voltage 35. For instance, the actual reset voltage 38 is obtained by subtracting the ON-voltage 33 or OFF-voltage 34 (see FIG. 4B) from the reset voltage 31 (see FIG. 4A). As will be easily understood from the foregoing descriptions, according to the invention, the alignment of the liquid crystal molecule can be reset to the condition as shown in FIG. 3A without receiving the influence of the succeeding display contents.

The light transmission characteristics of the predetermined pixel at the above reset condition in case of no dye molecule will depend upon the elongated axis of the lower polarizing plate 20 (see FIG. 2). When the elongated axis of the lower polarizing plate 20 is perpendicular to the drawing plane, i.e., so-called "cross-Nicol", the light transmission characteristics of the pixel are in dark. If it is in the so-called "parallel-Nicol", the light transmission characteristics of the pixel are in light. When the dye molecule exists in the liquid crystal, the light transmission characteristics of the pixel are in dark according to the invention.

When the display content is "ON", the actual ON-voltage 36 is applied to the given pixel, the molecule alignment or orientation thereof being shown in FIG. 3B. When the display content is "OFF", the actual OFF-voltage 37 is applied to the given pixel, the molecule alignment or orientation being shown in FIG. 3A.

In a case of medium display conditions between the above-described ON and OFF displays, the analogue modulation method by using the voltages between the ON-voltage 36 and the OFF-voltage 37, or the pulse width modulation method by controlling the time ratio of the ON-voltage 36 to the OFF-voltage 37 is performed to display the medium display conditions in which the molecular alignments of FIG. 3A and FIG. 3B are properly mixed with each other.

It should be noted that the light transmission condition of the reset condition is selectable to be either in light or in dark, and also the light and dark conditions may be alternately repeated.

Figure 5:
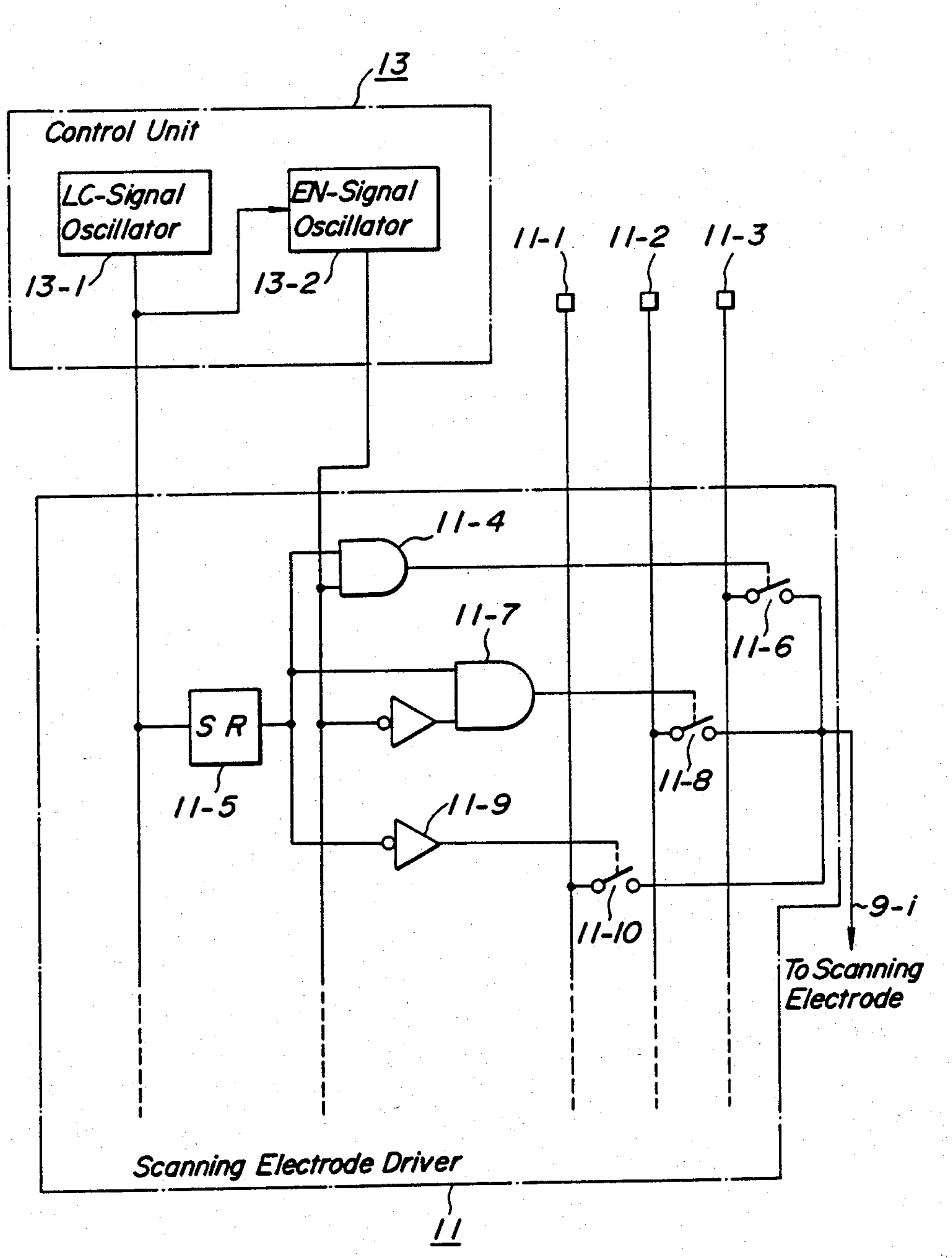
FIG. 5 schematically shows internal circuit diagrams of the control unit and the scanning electrodes driver shown in FIG. 1.
Figure 6:
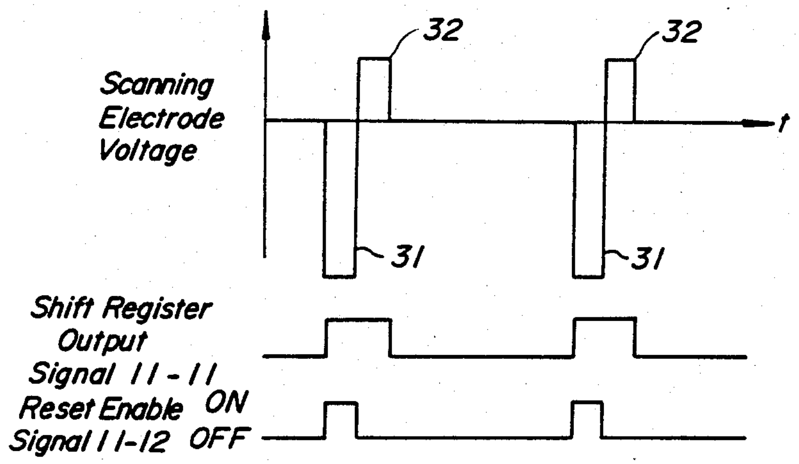
FIG. 6 shows waveforms of operation voltages of the control unit and the scanning electrode driver shown in FIG. 5.

Referring to FIGS. 5 and 6, a description will now be made of internal circuits of the control unit 13 and the scanning electrode driver 11.

The control unit 13 includes an oscillator of line shift signals for scanning electrodes 13-1 and an oscillator of enable signals 13-2. The line shift signal oscillator 13-1 produced line shift signals which are delivered to the enable signal oscillator 13-2 and to a shift register 11-5 of the scanning electrode driver 11. As a result, the shift register 11-5 is driven to shift the scanning electrode, e.g., 9-*i* to be selected in this embodiment. Within the reset period just after such shift operation, both a reset enable signal 11-12(see FIG. 6) and an output signal of the shift register 11-11 (see FIG. 6) are input to an AND gate 11-4. The reset enable signal is generated in the enable signal oscillator 13-2 in response to the line shift signal by means of the well-known one-shot multivibrator or the clock counter. Accordingly, a switch 11-6 of the scanning electrode driver 11 is closed by the output of the AND gate 11-4 so that the actual reset signal voltage 35 (see FIG. 4C) appearing at a reset terminal 11-3 is applied to the selected scanning electrode 9-*i*.

During the writing period, the reset enable signal is changed to be "OFF" and the output of the shift register 11-5 remains high so that only an AND gate 11-7 delivers its output to a switch 11-8 of the scanning electrode driver 11. As a result, the switch 11-8 is closed and thus the writing voltage 32 appearing at a write terminal 11-2 is applied to the selected scanning electrode 9-*i*.

Thereafter, the scanning electrode to be selected is shifted and the output of the shift register 11-11 is brought into the non-selective condition. Then, only an output of an inverter 11-9 is brought into the active condition, whereby a switch 11-10 is closed to apply a non-selective voltage appearing at a non-selective voltage terminal 11-1 to the selected scanning electrode 9-*i*.

According to the present invention, the orientation of the ferroelectric liquid crystal's molecule in the pixels can be controlled to a predetermined alignment condition before the write operation of the signal information starts, so that the display contents of the signal information in the pixels are not influenced by those of the preceding signal information, thereby independently performing the respective write operation. Consequently, the display reliability of the liquid crystal display panel can be greatly improved.

While the invention has been described in terms of certain preferred embodiments, and exemplified with respect thereto, those skilled in the art will readily appreciate that various modifications, changes, omissions, and substitutions may be made without departing from the spirit of the invention.

For instance, although the AND gates and the shift register were employed in the scanning electrode driver 11, other logic circuits may be utilized to constitute the equivalent circuitry of the driver.

What is claimed is:

1. A liquid crystal display apparatus comprising:

a plurality of scanning electrode means;

a plurality of signal electrode means positioned perpendicular to the scanning electrode means to form a matrix and enclosing a ferroelectric liquid crystal layer having a plurality of pixels in conjunction with the scanning electrode means;

first drive means for selecting and sequentially driving the scanning electrode means by applying write-in voltages thereto;

second drive means for driving the signal electrode means by applying voltages corresponding to display contents of the display apparatus in synchronism with the application of the write-in voltages; and, control means coupled to the first and second drive means, for controlling the first drive means so as to apply reset voltages to the respective pixels of the ferroelectric liquid crystal layer, whereby orientation of the liquid crystal's molecule is subjected to be constant before the selection of the scanning electrode means.

2. A liquid crystal display apparatus as claimed in claim 1, wherein a drive period during which the reset voltage is being applied to a first scanning electrode of said scanning electrode means, is interposed between a first time instant at which a second scanning electrode is selected just before said selection of the first one, and a second time instant at which said first scanning electrode is selected.

3. A liquid crystal display apparatus as claimed in claim 1, wherein a polarity of potential of the scanning electrode means which appears during the application of the reset voltages, is reversed with respect to the polarity of the write voltages.

4. A liquid crystal display apparatus as claimed in claim 1, wherein said orientation of the liquid crystal's molecule by the application of the reset voltages is to display black on the liquid crystal display apparatus.

* * * * *

Notice of Adverse Decision in Interference

In Interference No. 102,323, involving Patent No. 4,711,531, S. Masubuchi, FERROELECTRIC LIQUID CRYSTAL DISPLAY APPARATUS USING A RESET VOLTAGE STEP, final judgment adverse to the patentee was rendered Apr. 4, 1990, as to claims 1-4.

( *Official Gazette May 8, 1990* )